United States Patent [19]
Abe

[11] Patent Number: 6,045,739
[45] Date of Patent: Apr. 4, 2000

[54] METHOD OF MANUFACTURING A MOLDED PRODUCT INTERNALLY HAVING INSERTS IN A LAYERED STATE

[75] Inventor: Kimihiro Abe, Shizuoka, Japan

[73] Assignee: Yazaki Corporation, Tokyo, Japan

[21] Appl. No.: 09/003,756

[22] Filed: Jan. 7, 1998

[30] Foreign Application Priority Data

Jan. 9, 1997 [JP] Japan ................................ 9-002385

[51] Int. Cl.⁷ ............................ B29C 33/12; B29C 70/72
[52] U.S. Cl. ............................................ 264/277; 264/278
[58] Field of Search ....................... 264/272.11, 272.14, 264/272.15, 274, 275, 277, 278; 174/76, 77 R; 29/876, 877, 883, 884

[56] References Cited

U.S. PATENT DOCUMENTS

| 3,258,831 | 7/1966 | Angele et al. ........................... 29/884 |
| 3,404,454 | 10/1968 | Sayles ....................................... 29/883 |
| 4,029,388 | 6/1977 | Knoll ....................................... 264/276 |
| 4,301,325 | 11/1981 | Hutchinson ............................... 174/76 |

FOREIGN PATENT DOCUMENTS

7-88882  4/1995  Japan .

*Primary Examiner*—Angela Ortiz
*Attorney, Agent, or Firm*—Armstrong, Westerman, Hattori, McLeland & Naughton

[57] ABSTRACT

A method of eliminating difficulties in holding inserts at the time of molding, and for ensuring the inserts at predetermined positions is provided. According to this method, the edges of the inserts are alternately arranged in a stair-like state. These edges are held by a stair-like holding portion formed by an upper metal mold and a slide metal mold, and/or a lower metal mold and another slide metal mold, so that they can be secured at predetermined positions. Thereafter, resin is injected into the cavity formed inside the metal molds.

7 Claims, 7 Drawing Sheets

METHOD OF MANUFACTURING A MOLDED PRODUCT INTERNALLY HAVING INSERTS IN A LAYERED STATE

BACKGROUND OF THE INVENTION

1. Field of the Invention

The present invention relates to an insert molding method and a metal mold for insert molding. More particularly, the present invention relates to a method of manufacturing a molded product having inserts in a layered state.

2. Related Art

Various methods have been suggested for securing inserts to a predetermined position when manufacturing a molded product having inserts which are integrally embedded into the molded product.

Figure 9A:
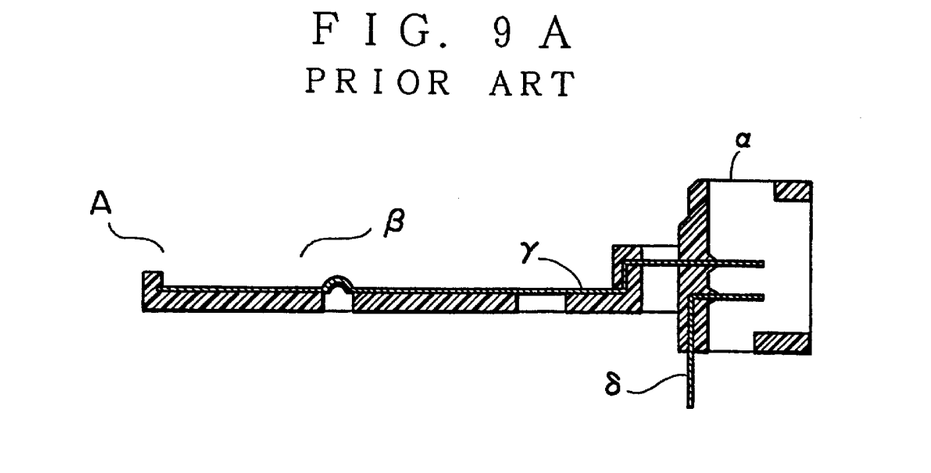
FIG. 9A is a sectional view of the intermediate product obtained by the insert molding method of the prior art.

For instance, Japanese Patent Application Laid-Open No. 7-88882 discloses a method for solving problems which arise in manufacturing a molded product. FIG. 9A is a sectional view of a switch box A provided with a connector unit α outside.

Reference character γ indicates a bus bar for electrically connecting the upper terminal of the connector unit α to a switch box unit β. Reference character δ indicates a bus bar for electrically connecting the lower terminal of the connector unit α to the outside of the switch box A.

Figure 9B:
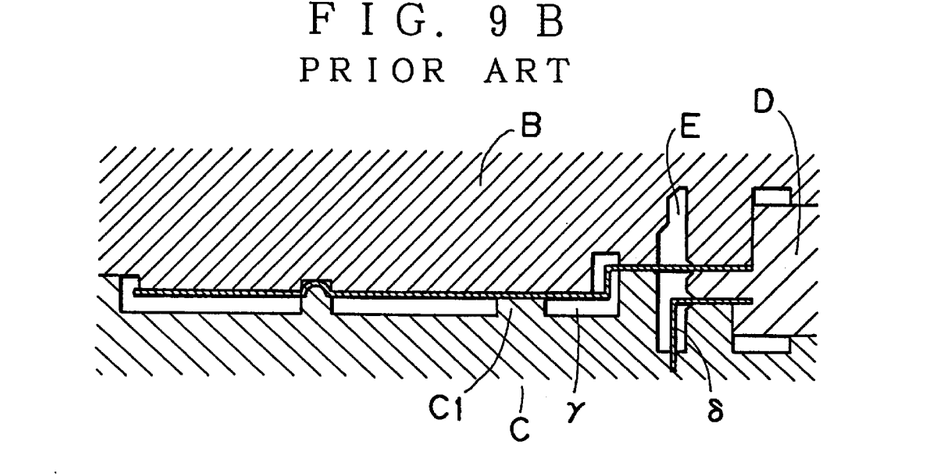
FIG. 9B is a sectional view of the metal mold used for obtaining the product shown in FIG. 9A.

The switch box A is obtained by inserting bus bars γ and δ, in advance, into a cavity E formed by an upper metal mold B, a lower metal mold C, and a slide metal mold D, as shown in FIG. 9B, and then injecting resin into the cavity E. Here, the bus bar γ is held between a convex portion C1 on the lower metal mold C and the upper metal mold B.

In the prior art, however, other bus bars cannot be held in a position parallel to the bus bar γ in a layered state to electrically connect the lower terminal of the connector unit α to the switch box unit β. If the bus bar cannot be held during insert molding, there might be a collision between inserts inside the molded product. This makes the molded product unreliable, and contacts cannot be maintained at necessary positions inside the switch box.

Figure 9C:
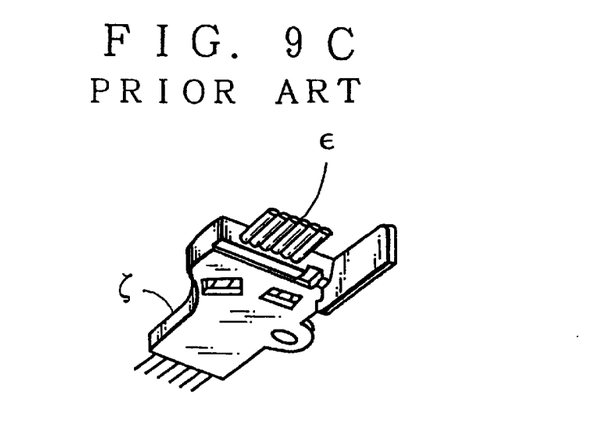
FIG. 9C is a perspective view of another component used with the intermediate product shown in FIG. 9A.

To eliminate the above problem, Japanese Patent Application Laid-Open No. 7-88882 discloses a method in which the connector unit α is provided outside the switch box A, and bus bars are disposed in such positions that they are in parallel with the bus bar γ when a separate component ζ having a separately-made terminal ε as an insert (shown in FIG. 9C) is inserted into the connector unit α later on.

In such case, however, the slide metal mold is necessary, and to obtain one product, insert molding has to be performed twice, making the manufacturing process very complicated. The above method has a further disadvantage in that since the separate component ζ is inserted into the connector unit α later on, it tends to come off when disconnecting the connector unit α from a mating connector.

According to the above method of the prior art, no convex portion like the convex portion C1 can be formed on the metal mold when it is necessary to maintain a water resisting property in some degree. In such case, there is no way to arrange bus bars at predetermined positions.

In the case where the inserts are bus bars which need to be electrically connected, the slide metal mold D as shown in FIG. 9B is necessary for preventing resin from adhering to the surface that should remain exposed. Such method of the prior art has disadvantages in that the slide metal mold D results in high production costs and tends to break down in the molding process.

SUMMARY OF THE INVENTION

The object of the present invention is to eliminate the difficulties in holding inserts at the time of molding, and to provide a method in which the inserts can be fixed at predetermined positions.

To achieve the above object, the present invention provides a method of manufacturing a molded product internally having inserts in a layered state. According to this method, the edge portions of the inserts are alternately positioned in a stair-like state, and secured to predetermined portions, respectively, in a stair-like holder formed by an upper metal mold and a slide metal mold, and/or a lower metal mold and a slide metal mold, and resin is then injected into the cavity formed.

The above and other objects and features of the present invention will be more apparent from the following description taken in conjunction with the accompanying drawings.

DESCRIPTION OF THE PREFERRED EMBODIMENTS

In the present invention, it is preferable to use metal molds having guide portions for guiding the inserts held in the metal molds to predetermined positions at the time of clamping, because the inserts can be secured at the predetermined positions even if they are somewhat deformed.

In the case where the inserts are bus bars or the like, and the edges of them are required to be exposed to the outside of the molded product, it is preferable to use metal molds having a resin inflow preventing mechanism which prevents the resin from flowing onto the surfaces that should be exposed.

If the resin is injected into the cavity when the surfaces of the inserts that should be exposed are closely held by the inner walls of the cavity formed by the metal molds, a small amount of resin enters between the inner walls of the cavity and the surfaces of the inserts that should be exposed, thereby forming a thin-film resin layer over the surfaces that should be exposed. In the case where the inserts are bus bars and where the surfaces that should be exposed are used as contact points, the surfaces that should be exposed cannot function as contact points due to the forming of the thin resin layer. As a result, an extra process becomes necessary to remove the resin layer from the contact points after molding.

The forming of such resin layer due to the wide-spread inflow of resin can be prevented by maintaining gaps between the surfaces that should be exposed and the inner walls of the cavity.

When arranging a plurality of inserts inside the metal molds, it is preferable to employ an auxiliary element to which the inserts are provided in advance. The arrangement of the inserts can be made easier by disposing the auxiliary element in the metal molds. Also, it is easier to prevent the inserts from colliding with each other inside the molded product. This technique is especially effective in manufacturing connectors in which the inserts are conductive materials such as bus bars.

If the auxiliary element is made of the same resin component as the molded product, defects such as deformation after molding can be prevented, because such auxiliary element can be incorporated into the molded product.

The following is a detailed description of the molding method according to the present invention, with reference to the accompanying drawings.

Figure 1A:
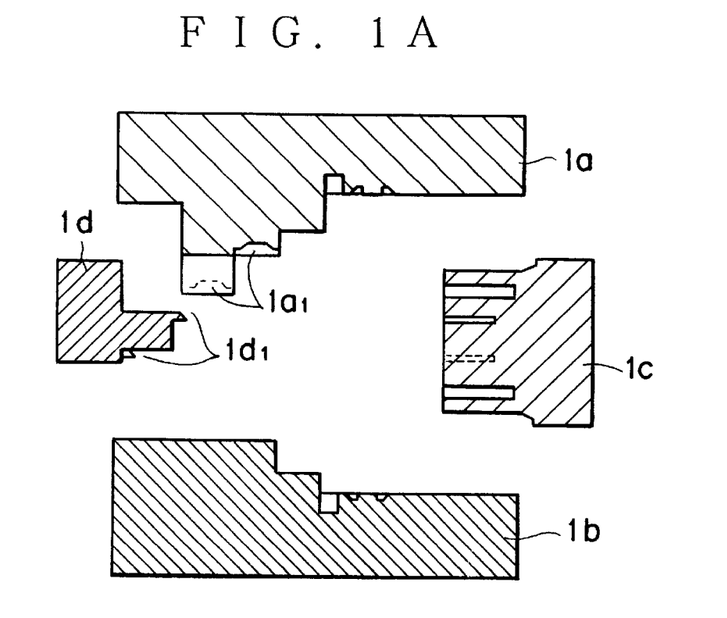
FIG. 1A is a sectional view of an example metal mold of the present invention.

FIG. 1A is a sectional view of an example metal mold (metal mold for molding a connector) of the present invention. Element 1a indicates an upper metal mold, 1b indicates a lower metal mold, 1c and 1d indicate a slide metal mold.

Figure 1B:
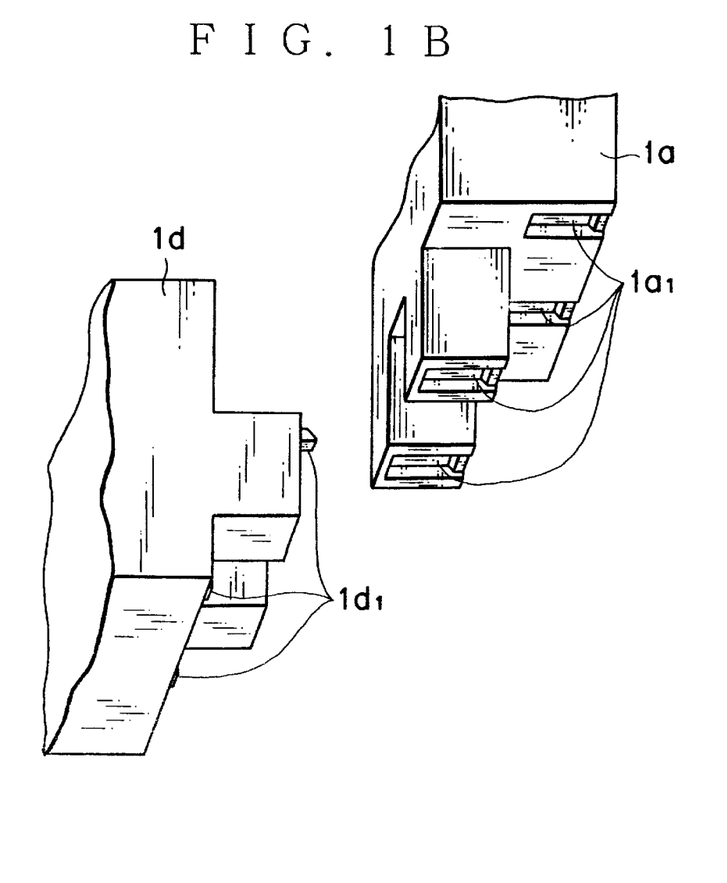
FIG. 1B is a partially enlarged view (perspective view) of the metal mold shown in FIG. 1.

The upper metal mold 1a is provided with concave portions $1a_1$, while the slide metal mold 1d is provided with projecting sealing portions $1d_1$. These concave portions and sealing portions constitute a resin inflow preventing mechanism which prevents resin from flowing onto the surfaces of the inserts that should be exposed. The edges of the sealing portions $1d_1$ have oblique surfaces so as to form guide portions, as shown in FIGS. 1A and 1B. These guide portions guide the inserts to the predetermined positions in the metal mold at the time of clamping described later on.

FIG. 1B is a perspective view of the upper metal mold 1a and the slide metal mold 1d taken from the underside.

Figure 2:
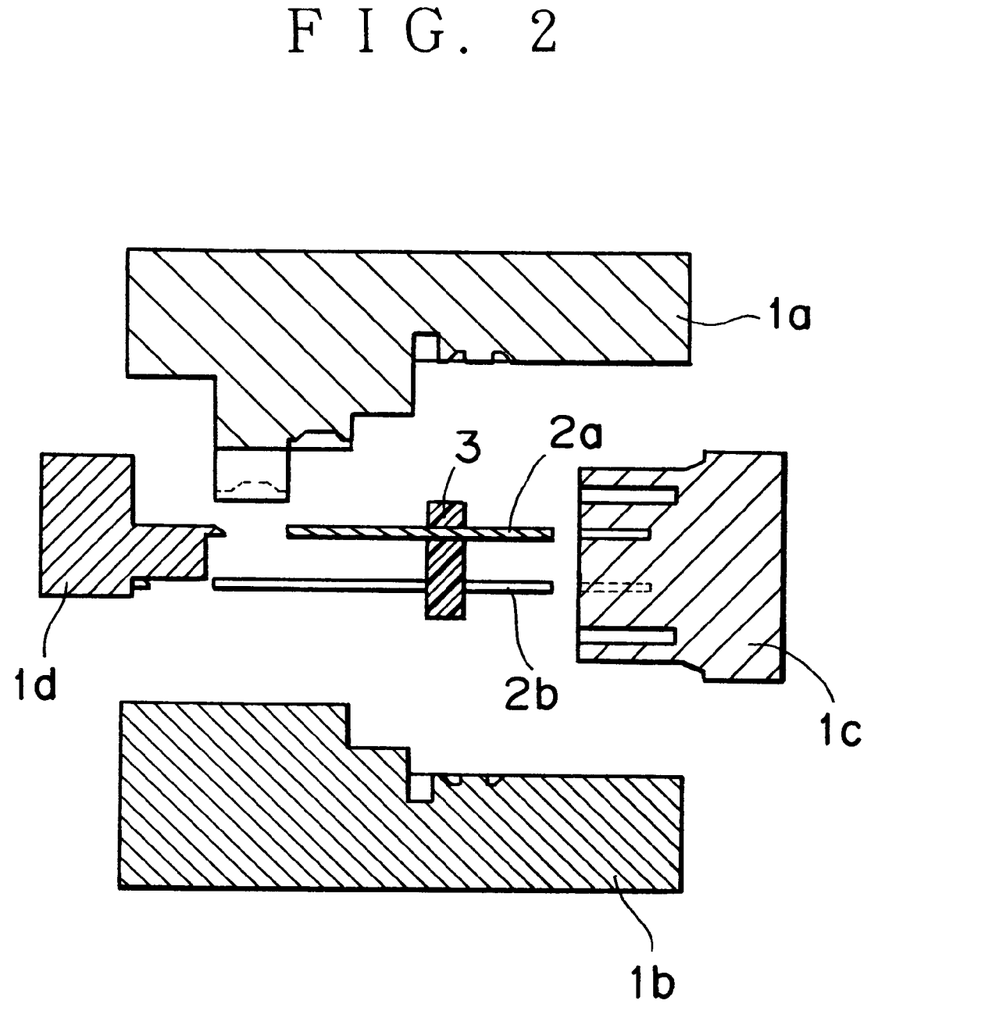
FIG. 2 is a sectional view showing how the inserts are set into the metal mold shown in FIG. 1.

As shown in FIG. 2, bus bars as inserts are set into the concave portions of those metal molds. Although the bus bars are shown as 2a and 2b in FIG. 2, the edges of the inserts are actually arranged in a stair-like state. The edges of the inserts are alternately arranged so as to correspond to the concave portions $1a_1$ of the upper metal mold 1a shown in FIG. 1B.

Figure 3:
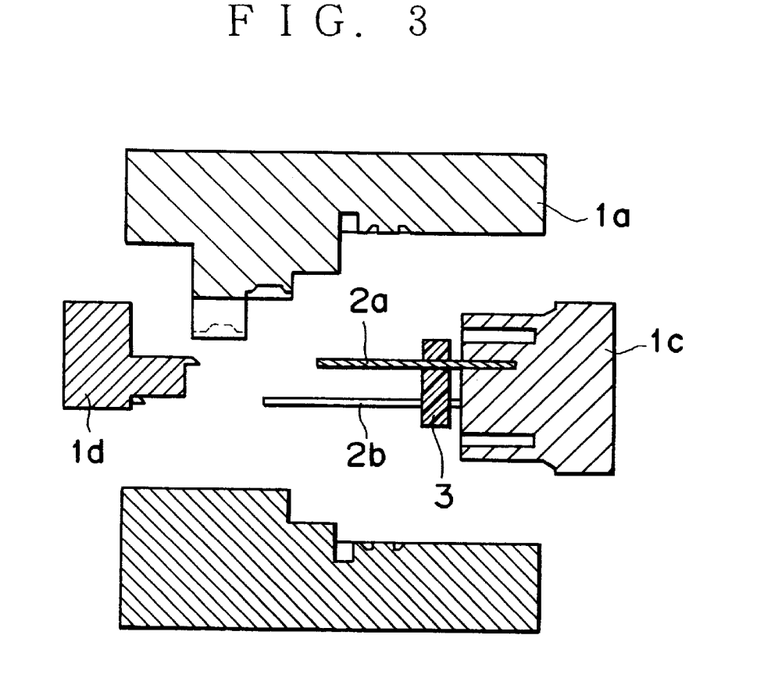
FIG. 3 is a sectional view showing the metal mold, with the inserts being set thereinto.

Since the bus bars 2a and 2b are held by an auxiliary element 3, they can easily be set into the metal molds (see FIG. 3).

Figure 4:
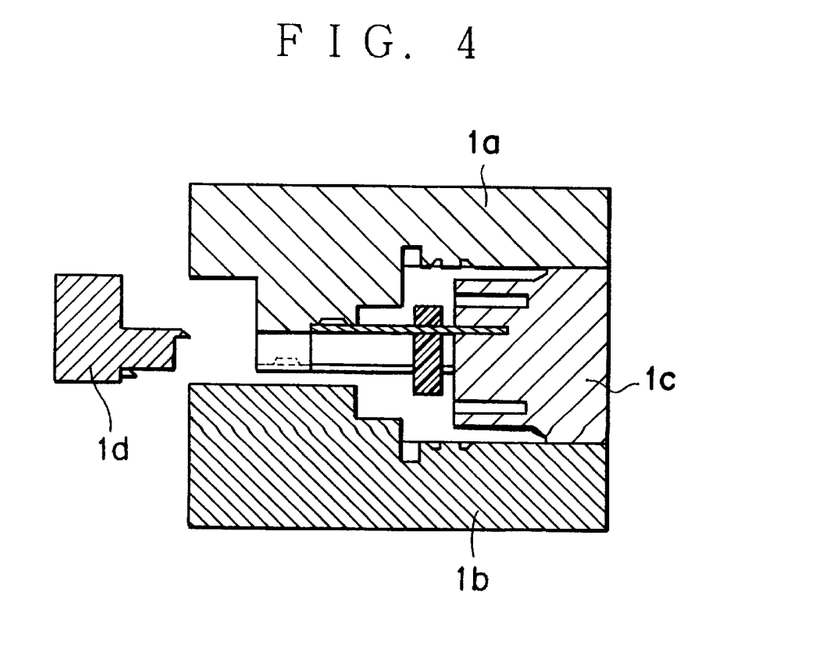
FIG. 4 is a sectional view of the metal mold before it is clamped.
Figure 5:
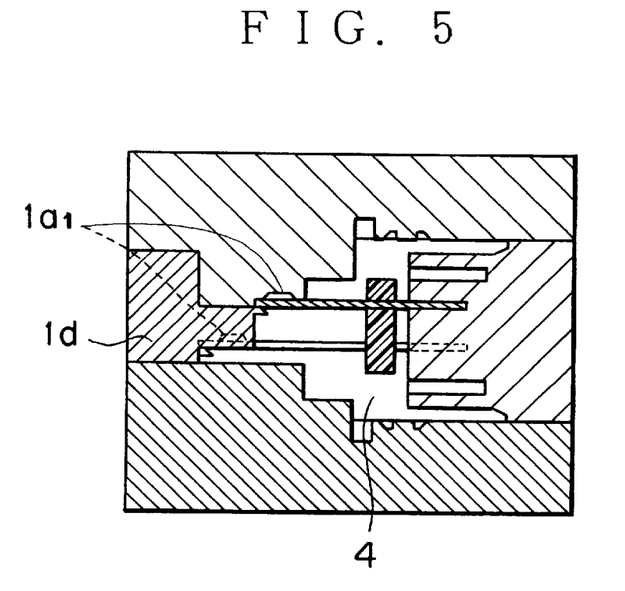
FIG. 5 is a sectional view of the clamped metal mold.

After the inserts have been set into the metal molds, the clamping is performed. More specifically, the upper metal mold and the lower metal mold are first clamped as shown in FIG. 4, the slide metal mold 1c is then clamped, and the slide metal mold 1d is finally clamped as shown in FIG. 5. Upon clamping of the slide metal mold 1d, a slight gap between the edges of the inserts causes no trouble, because the above-mentioned oblique edges (guide portions) of the sealing portions $1d_1$ surely lead the inserts to the predetermined positions in the metal molds. By virtue of the sealing portions $1d_1$, the surfaces of the inserts 2a and 2b that should be exposed are positioned in the concave portions $1a_1$ of the upper metal mold 1a. As a result of this, resin inflow over the surfaces that should be exposed can be prevented at the time of resin injection.

Figure 6:
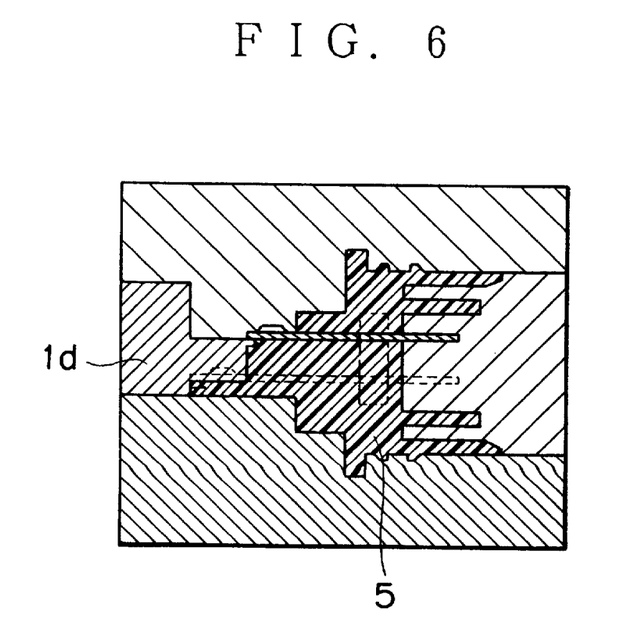
FIG. 6 is a sectional view of the metal mold, with resin being introduced thereinto.

After the clamping, resin 5 is introduced (see FIG. 6), via a runner (not shown in the figure), into a cavity denoted by reference numeral 4 in FIG. 5. Since the resin 5 is made of the same material as the auxiliary element 3, the auxiliary element 3 is perfectly integrated with the resin 5 to prevent cracks and deformation. The surfaces that should be exposed of the inserts can remain exposed by virtue of the sealing portions $1d_1$ and the concave portions $1a_1$, which prevent the resin 5 from flowing onto the surfaces that should be exposed.

Figure 7A:
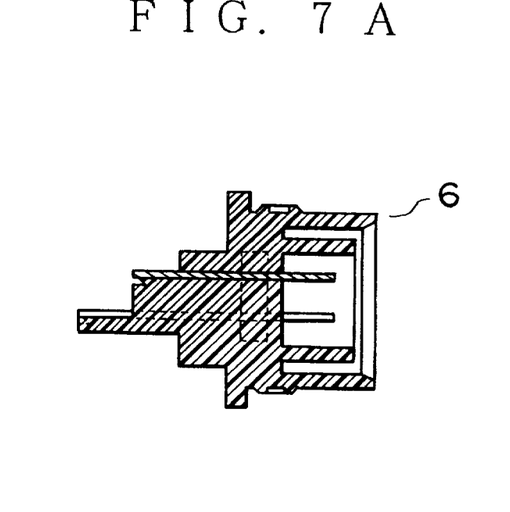
FIG. 7A is a sectional view of the molded product (connector)

After the resin 5 has been cooled and hardened, the molded product is taken out of the molds. FIG. 7A is a sectional view of the molded product 6 (connector), while FIG. 7B is an enlarged perspective view of the edges of the bus bars (inserts).

Figure 7B:
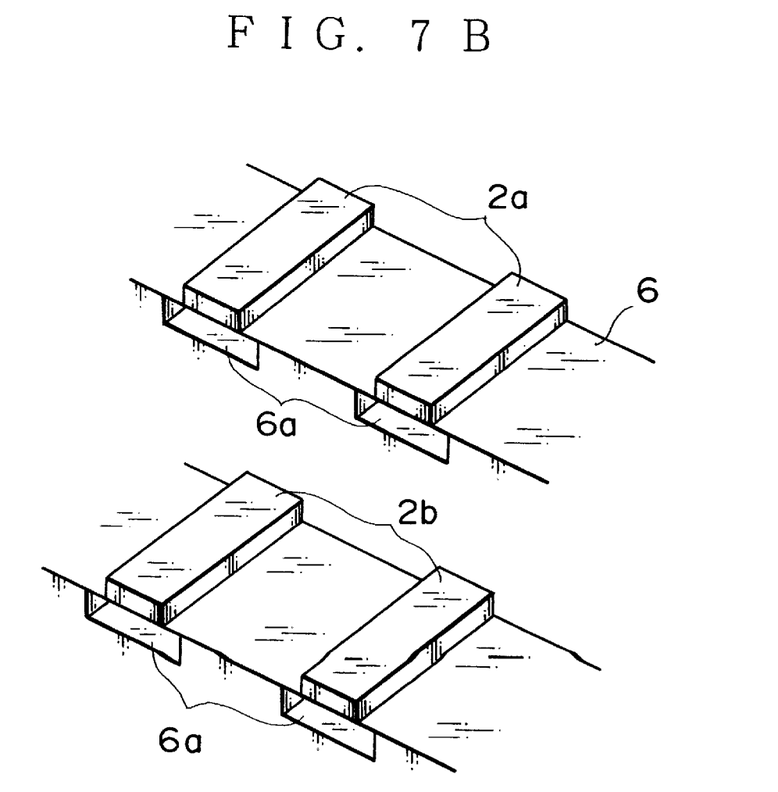
FIG. 7B is a partially enlarged view (perspective view) of the molded product.

As can be seen from FIG. 7B, the edges of the inserts are arranged alternately in a stair-like fashion. Reference code 6a in FIG. 7B indicates concave portions formed by the sealing portions $1d_1$ of the slide metal mold 1d.

Figure 8:
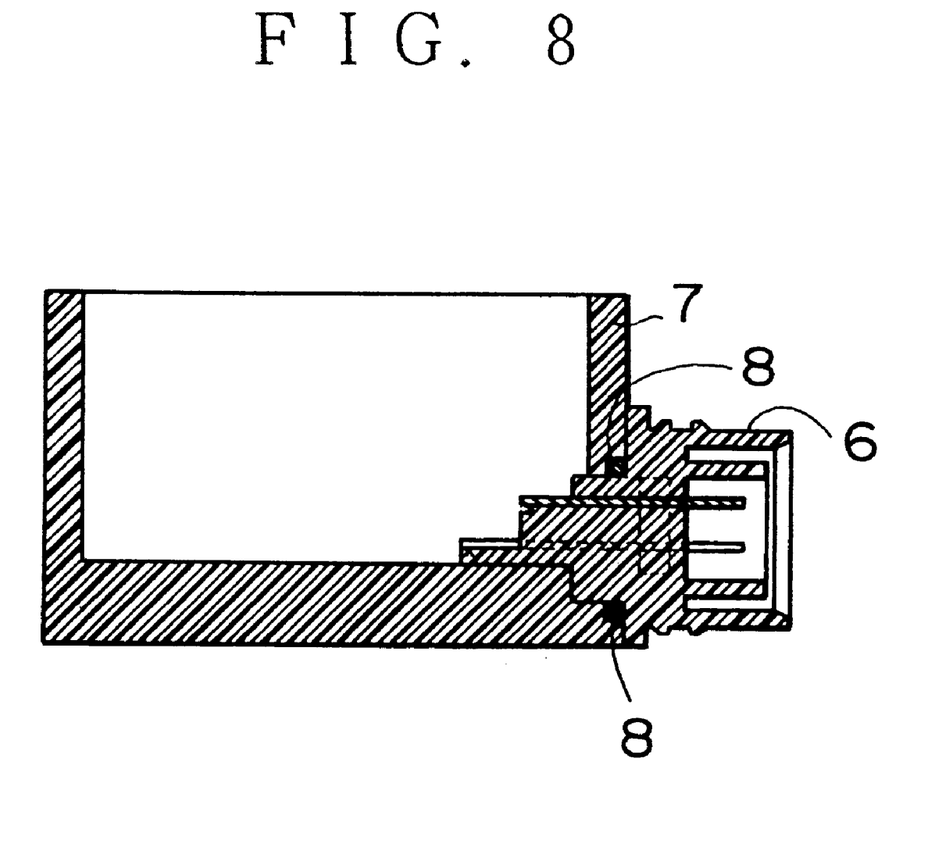
FIG. 8 is a sectional view of a water-resistant connector box in which the molded product (connector) is employed.

A water-resistant connector box can be easily formed by combining the connector 6 with a box 7 and O-shaped sealing rings 8.

According to the molding method of the present invention described so far, a molded product internally having inserts can be easily manufactured. Since the inserts can be secured at predetermined positions, a collision between bus bars inside the molded product can be prevented, thereby improving the yield of the product.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of manufacturing a molded product internally having inserts in a layered state, comprising the steps of:

arranging edges of inserts alternately in a plurality of stair steps;

holding said edges of inserts with a holding portion having a plurality of stair steps defined by a slide metal mold and at least either one of an upper metal mold or a lower metal mold, so that said edges of inserts are secured in a stair step arrangement at predetermined positions; and injecting resin into a cavity formed inside the metal molds and embedding the inserts to form the molded product.

2. A method according to claim 1, wherein the metal molds have guide portions for guiding said inserts provided inside the metal molds to the predetermined positions at the time of clamping.

3. A method according to claim 2, wherein said guide portions each has a tapered surface for smoothly guiding said inserts to the predetermined positions.

4. A method according to claim 1, wherein the metal molds have a resin inflow preventing mechanism which can prevent resin from flowing onto surfaces of said edges of inserts which should remain exposed at the time of resin injection.

5. A method according to claim 4, wherein said resin inflow preventing mechanism for preventing resin inflow comprises projecting sealing portions which are in contact with the angles of in the inserts inside the metal molds, and concave portions formed inside the metal molds.

6. A method according to claim 1, wherein an auxiliary element to which inserts are provided beforehand are disposed inside the metal molds, so that said inserts can be readily arranged inside the metal molds.

7. A method according to claim 6, wherein said auxiliary element is made of the same resin material as the molded product itself.

* * * * *